Oct. 6, 1936. E. G. BAUER 2,056,556

GREEN CORN HUSKER

Filed May 4, 1934

INVENTOR
Edward G. Bauer
BY
ATTORNEY

Patented Oct. 6, 1936

2,056,556

UNITED STATES PATENT OFFICE 2,056,556

GREEN CORN HUSKER

Edward G. Bauer, Hoopeston, Ill., assignor to Food Machinery Corporation, San Jose, Calif., a corporation of Delaware Application May 4, 1934, Serial No. 723,988

6 Claims. (Cl. 130—5)

This invention relates to improvements in green corn huskers and has particular reference to that part of the huskers where the husks are loosened just prior to cutting the butts from the ears and the holding of the ears in proper alignment relative to the butting devices.

Present day green corn huskers have a horizontal feed table on which the ears of corn are placed in front of cross flights of a continuous feed chain which move the ears along the table with their axes at right angles to their path of travel, and during their travel they encounter devices that move the ears axially against stop members to bring the butts into proper position relative to butting devices that cut off the stalk end of the ear.

The chain flights serve to hold the ears in cross alignment when there is no particular resistance to their forward movement, but when the ears contact with the butting devices the resistance offered tends to cause the ears to swing forward ahead of the flights and thus misalign the ear and cause the butt to be cut off at an angle. This swinging movement is due to the butt end of the ear tending to stop in the butting knives until sufficient pressure is applied to cut the butt off, then if the ear is canted the cut is not square across the butt but angular thereto which is undesirable.

In order to hold the ears squarely against the cross flights of the feed chain it is customary to place spring pressed arms over the feed table and above the path of the ears and the chain flights to press on the ears and tend to hold them against the flights by frictional engagement therewith. These arms press quite firmly on the ears and do hold them square while the butts are cut off.

A difficulty has been that these presser arms have been mounted to swing on a pivot somewhat back of their contact with the passing ears so that the forward ends swing up and away from the feed table, and sometimes out of contact with a forward ear if the following ear is quite large, they are usually placed, however, so that only one ear is contacted at a time, through the spacing of the flights that move the ears forward, they being spaced so that an ear passes out from contact with the arms just as another ear enters contact with them.

The pivotal swing of the presser arms is satisfactory in operation when the ears do not vary too much in diameter, but when a very large ear and a very small ear follow each other the function of the presser arms holding the ears back against the chain flights seems to be somewhat interfered with, and to overcome this impairment of the action of the presser arms on the moving ears has been the object of this improvement.

Briefly the improvement forming the subject matter of this application consists in mounting the presser arms in such a manner that they still have the regular pivotal movement as the ears pass thereunder, but they also have an additional adjustment that permits of their being set or positioned relative to the feed table so that the portions of the arms actually contacting with the passing ears may remain in substantially a parallel relation with the table.

The operators in placing ears of corn on the feed table usually aim to throw out the very small or very large ears that occur only occasionally in a field run of corn so that an adjustment can be made for the arms so that they will contact with each ear as it passes and hold it in alignment and at the same time remain substantially parallel with the table. In other words it is not desirable in operation to have the arms lift too much when pressing on the ears.

When it is seen that the field run of a batch of corn is small or large in diameter the new adjustment provided for the mounting of the presser arms may be set to permit the arms to contact with the ears in the desired manner for most efficient operation, and repositioned relative to the feed table as often as may be necessary during a day's run or over a period covering a certain field or variety of corn.

The manner in which these desirable results are accomplished resides in the particular mounting provided for holding the presser arms in their desired operative position.

This mounting comprises offsetting the main support for the arms and the frame carrying them by means of a swinging connection that will carry the arms toward or away from the feed table according to the direction in which the connection is moved, and after the new position is determined the arms may be moved to lie parallel with the feed table and operate in this new position the same as before changing.

It is therefor an object of the invention to provide an improvement to corn huskers whereby the control of the ears during the butting operation may be more effective.

It is also an object of the invention to provide a mounting for the presser arms of a green corn husking machine that may be positioned toward or away from the feed table of the husker without changing their normal operation on the passing ears.

It is also an object of the invention to provide a mounting for the presser arms of a green corn husking machine wherein the mounting may be swung to a desired height and the frame member carrying the presser arms be realigned to bring the contact portions of the arms substantially parallel with the feed table of the husker.

Other objects and advantages that have not been enumerated will become apparent as the description proceeds, reference being now had to the accompanying drawing a better and clearer understanding of the improvement will be had.

Figure 1:
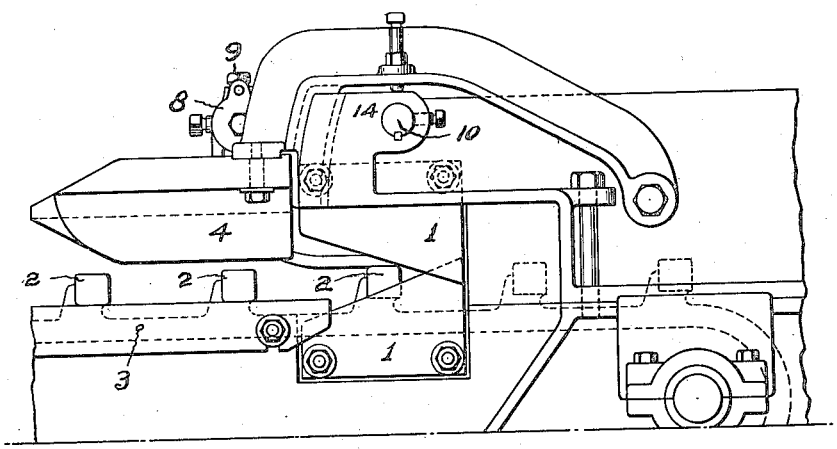
Figure 1 is a side elevation of a portion of a green corn husker embodying the improvement.
Figure 2:
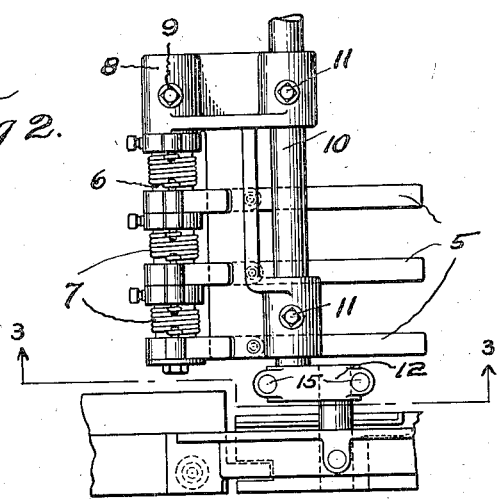
Figure 2 is a plan of Figure 1.

The numeral 1 represents the butting knives of a husker, in this instance being straight edged blades set to form a V opening into which the butt end of the ear is moved and the butt cut off as the ear is moved therepast.

2 represents the feed chain flights which are carried by an endless chain 3 only partially shown in the drawing, and that in dotted lines.

4 represents a weighted arm that assists in holding the butt end of the ear down in alignment during the start of the butting operation.

5 represents three presser arms mounted for swinging movement on the bar 6, and held in normal operative positions by the torsion springs 7. The bar 6 is carried by the frame member 8 and held against rotation by the set screw 9. The frame member 8 is in turn mounted on the bar 10 and held from rotation relative thereto by the set screws 11. On the end of the bar 10 is a link member 12 mounted on a short stud 13 which in turn is mounted in a portion of the frame work of the machine as at 14. This stud 13 is keyed to the frame 14 so it will not turn from its position. The link 12 is secured to the stud 13 and bar 10 by means of clamp screws 15.

16 indicates a husk tearing spur set in the arms 5 to loosen the husks of the ears as they pass and 17 indicates a like spur set in the bed 18 for also loosening the husks on the ears as they pass.

Operation

In applying the improvement to a husker as shown by the drawings the following conditions would prevail during operation.

Figure 3:
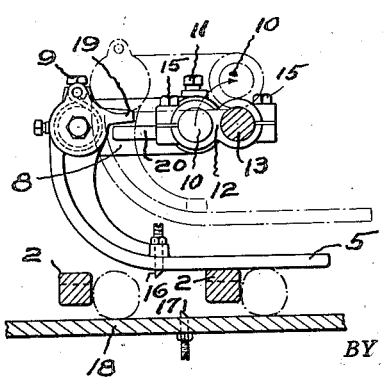
Figure 3 is a sectional elevation taken on substantially line 3—3 of Figure 2.

In Figure 3 is will be observed that the presser arms 5 are in one position by full lines and in another position by dotted lines.

The full line position may represent the desired adjustment of the arms relative to the feed table 18 when operating on small diameter ears, and the dotted position when operating on large diameter ears.

For the small diameter adjustment it will be seen that the link 12 is substantially horizontal and the frame 8 also horizontal which is necessary so as to bring the presser arms 5 into parallelism with the feed table and permit the stop 19 on the arms 5 to rest on the stop 20 forming a part of the frame 8. This condition holds the arms 5 in their normal position as in Figure 3 and will permit only a slight swinging of the presser arms 5 as the ears pass thereunder, assuming of course that the variety of corn being handled runs to small ears.

When we come to large diameter ears it might be necessary to adjust the presser arms to the position shown by the dotted lines of Figure 3.

Here it will be seen that the link 12 has been swung upward, pivoting on the stud 13 and carrying the frame 8 to a higher elevation, which when adjusted on the bar 10 to again lie in a horizontal position will place the presser arms parallel with the table 18 but higher thereabove than in the full line position.

This adjustment will take care of large diameter ears and the action of the presser arms on these large ears will be substantially the same as they were on the smaller ears when in the full line position.

It is easily seen that if a large ear that requires the dotted line adjustment were passed through the machine when set to the full line position the presser arms 5 would be elevated so much that the angle of the straight part of the arms would contact with the back of the ear next to the flight 2 and have a tendency to push it away from the flight which would be just the action not desired. The arms 5 should at all times tend to hold the ears back against the flights 2 and when the position of the arms can be adjusted to a height that will permit such contact with the ears we approach the ideal operative conditions. It is the frictional contact of the arms on the tops of the ears that gives the ideal operative conditions.

What I claim as new and desire to secure by Letters Patent is:

1. A mounting for the presser arms of a green corn husking machine comprising a table, a swinging frame member for carrying said presser arms, a pivotal mounting for said frame member, a link carrying said pivotal mounting and a separate pivotal mounting for said link, clamping means for securing said frame member and said link in any radial position on their respective pivotal mountings to thereby locate said presser arms parallel to said table and at varying heights therefrom, said presser arms being yielding so that when engaging passing ears of corn they may flex upward and press on said ears to hold them on said table.

2. A mounting for the presser arms of a green corn husking machine comprising a table, a swinging frame member for carrying said presser arms, a pivotal mounting for said frame member, a link carrying said pivotal mounting and a separate pivotal mounting for said link, clamping means for securing said frame member and said link in any radial position on their respective pivotal mountings, said frame member and said presser arms being always in parallel relation and parallel with said table when adjusted for normal operation, said presser arms being yielding to flex away from said table when engaging an ear of corn.

3. A machine for husking green corn comprising a feed table, a feed device, cross flights on said feed device for moving ears of corn over and along said feed table, an ear butting device along the path of the moving ears, presser arms positioned over said feed table and flights to contact with ears moving therealong and hold them against said flights and said table, a pivoted frame carrying said presser arms and a pivoted link carrying said frame, clamping means for securing said frame and said link into any desired positions to locate said presser arms at varying distances from said table and parallel thereto for normal operation, said presser arms adapted to yield when engaging a passing ear of corn.

4. A machine for husking green corn comprising a feed table, a feed device, cross flights on said feed device for moving ears of corn along said table, an ear butting device along the path of moving ears, presser arms positioned over said table to contact with ears of corn passing therealong, a swinging link mounted above said table, a frame member carried by said link and mountings on said frame member to carry said presser arms, yielding means for holding said presser arms in a normal operative relation to said table, clamping means for securing said link and said frame member when they are swung radially on their pivots to hold them in any one of a plurality of positions relative to said table to accommodate different sized ears.

5. A machine for husking green corn comprising a feed table, a feed device having cross flights, means for moving said feed device along said table, an ear butting device along the path of moving ears along said table, presser arms positioned over said table to contact with ears of corn passing therealong to hold said ears on said table and against said flights, as they meet said ear butting device, a link and bar pivoted above said table and having clamping means for holding said link in any radial position relative to said pivot, a frame member carried by said link and bar and having clamping means for holding it above and parallel with said table in a plurality of positions parallel thereto, said frame member carrying said presser arms yieldingly whereby said presser arms may flex away from said table when in engagement with passing ears of corn.

6. A machine for husking green corn comprising a table, feed means moving across said table to move unhusked ears therealong, a butting device along the path of moving corn, presser arms for engaging the ears and holding them on said table and against said feed means when passing said butting device, a swinging link and bar mounted above said table and a frame member mounted on said bar, clamping means for holding said link and said frame member in any desired positions, the frame member yieldingly supporting said presser arms so they normally rest parallel with the said table and flex therefrom when engaging a passing ear.

EDWARD G. BAUER.